Patented Mar. 16, 1926.

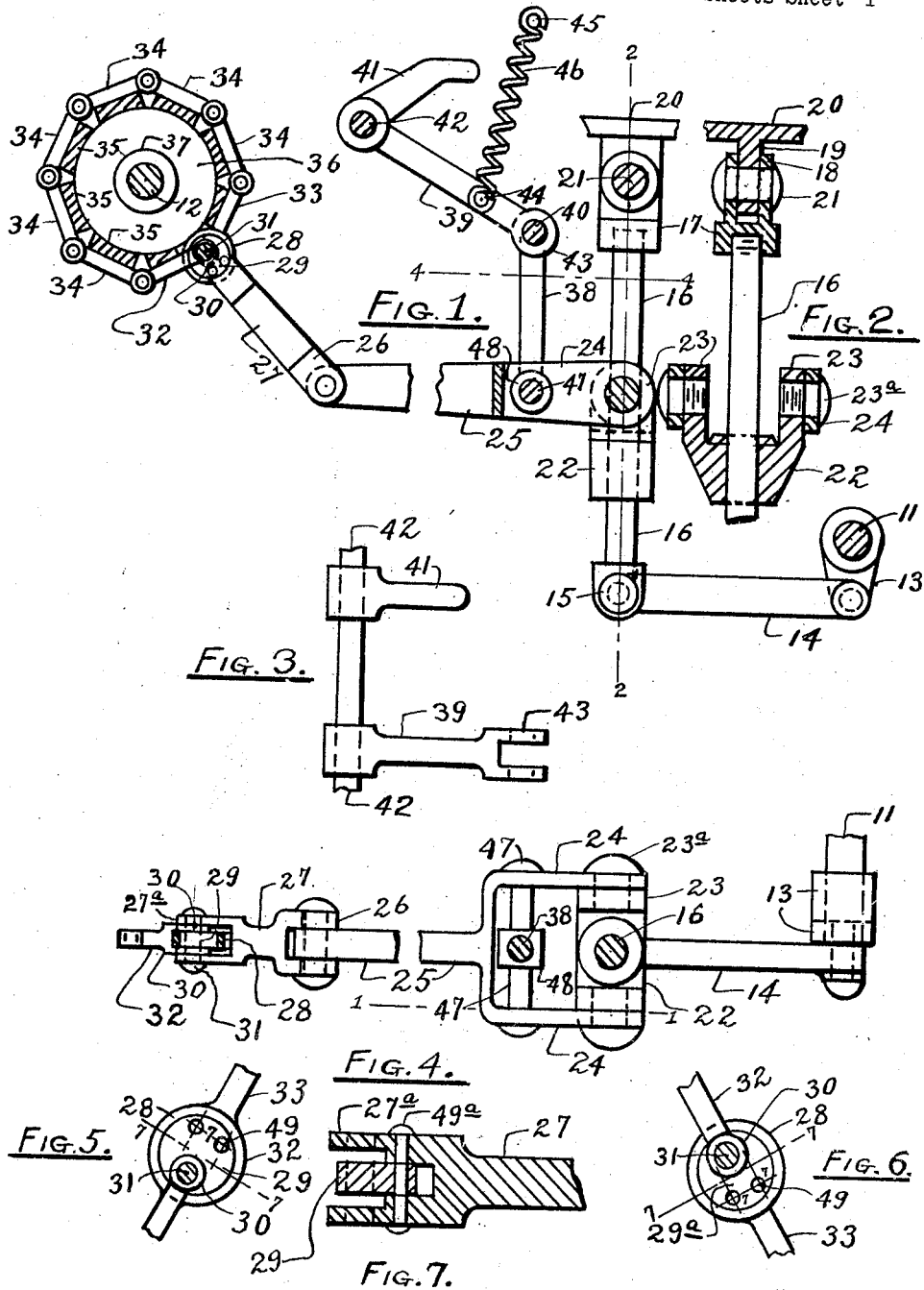

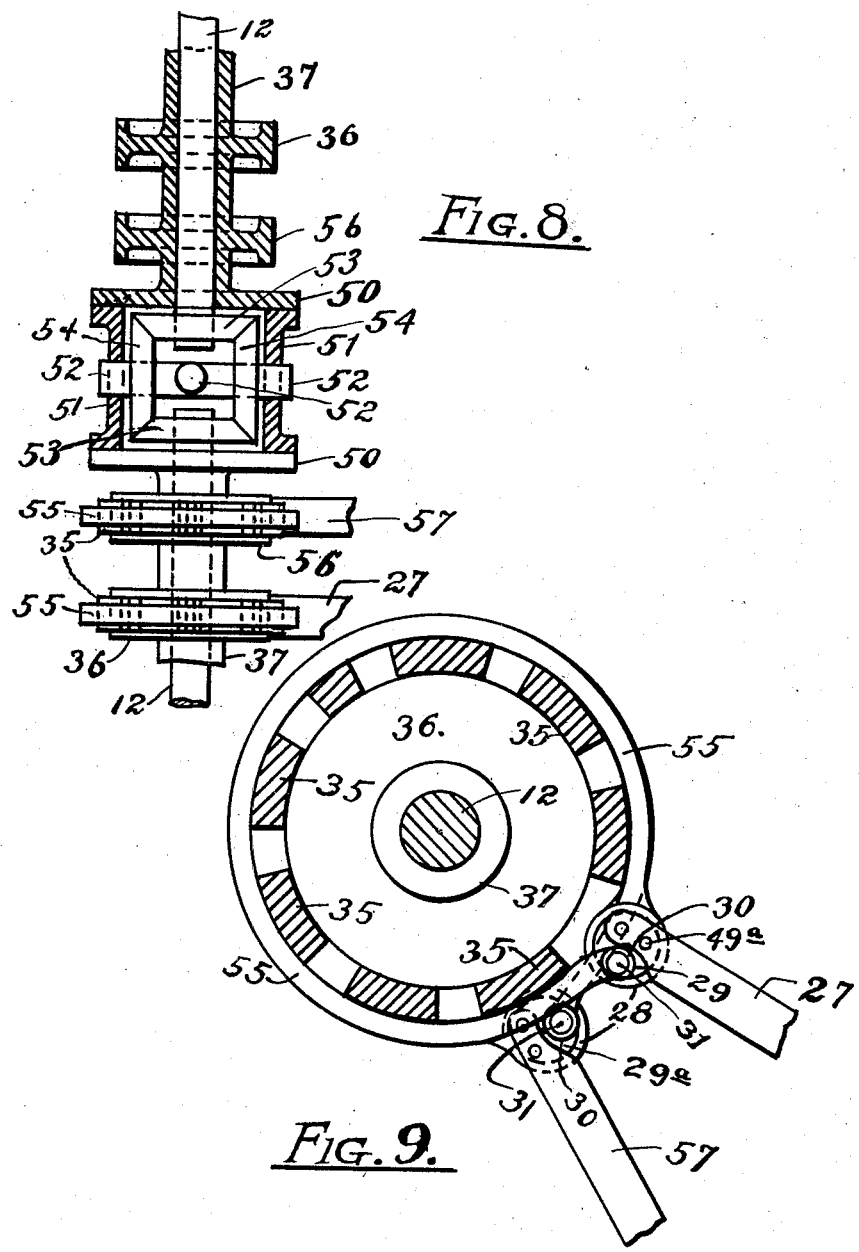

1,576,624

UNITED STATES PATENT OFFICE.

ISRAEL BENJAMINS, OF BROOKLYN, NEW YORK.

MECHANISM FOR POWER TRANSMISSION AND SPEED VARIATION IN AUTOMOBILES.

Application filed July 11, 1922. Serial No. 574,194.

*To all whom it may concern:*

Be it known that I, ISRAEL BENJAMINS, a citizen of the United States, residing at 376 Throop Ave., Brooklyn, in the county of Kings and State of New York, have invented a new and useful Mechanism for Power Transmission and Speed Variation in Automobiles, of which the following is a specification.

My invention relates particularly to automobiles wherein the power is transmitted from the engine shaft to the axle, and it consists in the novel features hereinafter more fully described.

One of the objects of my improvement is to eliminate gear wheels as a medium of power transmission and speed variation, thereby avoiding loss of power, due to friction, and annoyance due to breaking of teeth.

Another object of my improvement is to provide a larger extent of variation of speed in automobiles than is feasible with gear transmission.

A further object of my invention is to provide a power transmitting means whereby the engine shaft may be placed transversely to the body of the automobile, thereby causing all the cylinders to face the wind, thereby cooling the cylinders; and a still further object of my invention is to have my mechanism for power transmission and speed variation simple, durable and inexpensive.

Other objects and advantages will hereinafter appear.

I attain these objects by the mechanism, one form of which is illustrated in the accompanying drawings or by any mechanical equivalent or obvious modification of the same.

In the drawings Fig. 1 is partly a side elevation and partly a vertical section on the line 1—1 of Fig. 4, but showing the wearing blocks 35, hereinafter described, in section.

Fig. 2 is a vertical section on the line 2—2 of Fig. 1, looking from left to right, and broken away at the lower end.

Fig. 3 is a plan of the foot pedal, shifting lever and spindle thereof, which are hereinafter more fully described.

Fig. 4 is a sectional plan on the line 4—4 of Fig. 1, but omitting the axle, friction wheel and most of the clutch.

Fig. 5 is a detail of the eccentric 29, hereinafter described, in position for driving the automoble forward.

Fig. 6 is a detail of the eccentric 29$^a$ in position for reversing the automobile.

Fig. 7 is a detail in section, through the broken line 7—7—7 of Figs. 5 and 6, of the eccentric and the clutch lever 27, hereinafter described, showing one way of connecting the eccentric thereto.

Fig. 8 is a plan, partly in section, of the rear part of one form of my mechanism for power transmission, showing the relative positions of two forward clutch wheels or discs and two reversing clutch wheels or discs, also the connection thereof to the differential, and showing the clutch levers as broken off at their forward ends.

Fig. 9 is a front view, partly in section, on a larger scale of the parts shown in Fig. 8, also showing the relative positions of the forward eccentric and the reversing eccentric, each at the beginning of its stroke, forward rotation being clockwise in Fig. 9 as well as in Fig. 1.

Similar numerals refer to similar parts throughout the several views.

11 designates the engine shaft or crank shaft, which I prefer to place transversely to the body of the automobile and parallel to the axle 12 thereof. 13 is a side crank, which may conveniently be connected to the shaft 11 at one end thereof, which crank is adapted to rock the arm 16 by means of the reach rod 14, which is pivotally connected at one end thereof to the crank 13 and at the other end to the fork 15 at the lower end of the oscillating arm 16, which has at its upper end the head 17, which is pivotally connected to the lug 19 of the stationary part 20 of the automobile by means of the fork 18, which is made in one with said head 17, and the pin 21.

22 is a block or member adapted to slide on the oscillating arm 16, and it has made in one therewith the lugs 23, which are pivotally connected by means of the stud pins 23ª to the forked end 24 of the connecting rod 25, the other end of which is pivotally connected to the forked end 26 of the clutch lever 27.

The other end 27ª of the clutch lever 27 has rigidly connected thereto by means of the bolts or rivets 49ª as shown in Figs. 7 and 9 the eccentric 29 for driving the automobile forward; a similar clutch lever 57 is shown in Fig. 9 as having rigidly secured thereto the eccentric 29ª for reversing the automobile.

The two eccentrics 29 and 29ª, as shown in Figs. 5 and 6 differ only in position with relation to the disc 36 and the levers 27 and 57, when connected to the latter, as shown in Figs. 1 and 9, otherwise their construction is the same; and each is provided with the bolt holes 49 and a journal for the spindle 31.

The eccentric 29 or 29ª has swivelled thereon the strap 28 which may be made in one with or secured to the link 33 at the end of the chain 32—34—33 which is shown in Fig. 1, or the resilient clutch strap 55, shown in Figs. 8 and 9, which encircles the wheel 36—37, which is made in one with the hub, which is secured to the axle 12.

The other end of the chain shown in Fig. 1 terminates in the link 32, which is pivotally connected by means of the fork 30 and the spindle 31 to the eccentric 29 and the fork 27ª of the lever 27 as shown in Fig. 4. In a similar way the other end of the resilient clutch-strap 55, shown in Figs. 8 and 9, may be connected to the clutch end of the forward lever 27 or of the reversing lever 57.

The links of the chain 32—34—33 are shown in Fig. 1 and the clutch strap 55 is shown in Fig. 9 as having each connected thereto the wearing blocks 35 in contact with the periphery of the wheel 36—37.

The chain 32—34—33 or the clutch strap 55 with the wearing blocks 35 form a clutch for said wheel 36—37. The chain 32—34—33 or the clutch strap 55 forms with the eccentric 29 or 29ª and the strap 28 one flexible member, of which the length may be varied by turning the eccentric in its strap, thereby either shortening or lengthening the said flexible member, which shortening will cause the said flexible member to grip the wheel or disc 36, and the lengthening thereof will release said wheel 36.

It is evident that turning the lever 27 with the eccentric 29 clockwise in Fig. 1 and Fig. 9 will tend to tighten the chain 32—34—33 or the clutch strap 55 with its wearing blocks 35 on to the wheel 36—37, which will then turn the axle 12 in a clockwise direction, and vice versa; i. e. turning the lever 27 counterclockwise will loosen the chain from the wheel 36—37. In a similar way, turning the lever 57 with the eccentric 29ª counter clockwise in Fig. 9 will tend to tighten the clutch strap 55 with the wearing blocks 35 on to the wheel 56, which will then turn the axle 12 in a counter clockwise direction, and vice versa, i. e. turning the lever 57 clockwise will loosen the clutch strap 55 from the wheel 56.

The rotation of the axle 12 in a clockwise direction with an angular velocity higher than that of the lever 27 will also tend to loosen the chain 32—34—33 or the clutch strap 55.

A separate outfit may preferably be employed for reversing the motion of the axle 12 in an automobile the rear end of which is shown in Figs. 8 and 9.

In Fig. 8 two pair of clutch wheels or discs 36 and 56 are shown as swivelled on the axle 12 by means of the hubs 37 and connected to the differential casing 51 by means of the end plates 50, made in one with the hubs 37; the differential spider 52 may be connected to the casing 51 in any suitable manner, as by making the casing 51 in two or more sections; the bevel gears of the differential are diagrammatically shown by the pitch cones 53 and 54. 36—36 are the forward wheels or discs and 56 the reversing wheels or discs.

To vary the speed of the driving axle 12 with relation to the engine shaft 11 I provide a means for sliding the block 22 on the arm 16, which means is shown in Fig. 1 as consisting of the shifting link 38, which is pivotally connected at one end thereof to the fork 24 of the connecting rod 25 by means of the pin 47 and journal 48 and at the other end to the shifting lever 39 by means of the fork 43 at the end thereof and the pin 40.

The lever 39 is secured to the spindle 42, which has secured thereto the foot pedal or hand lever 41; the bearings of the spindle 42 are omitted for the sake of clearness.

The lever 39 has also connected thereto one end of the spring 46 by means of the pin 44; the other end of the spring is shown as connected to the pin 45, which is stationary with relation to the automobile, as are also the bearings of the spindle 42.

The action of the spring 46 tends to lift the block 22 until the center line of the pins 23ª coincide with the center line of the pin 21, when the connecting rod 25 ceases to rock the clutch lever 27 or 57; the axle 12 may then continue to rotate by the momentum of the automobile, but without receiving any impulse from the engine shaft 11.

When the foot pedal or lever 41 is depressed (or turned clockwise in Fig. 1) by the operator the block 22 is moved downwardly on said arm 16, whereby motion is imparted to the connecting rod 25 and clutch lever 27 or 57, whereby the axle 12 is rotated, the amplitude of the swing of the lever 27 or 57 being greater the lower the block is on said arm 16; and vice versa.

In this way the speed of the axle 12 may be varied by moving the block 22 up or down the arm 16 by means of the pedal 41.

As above mentioned, a separate mechanism, similar to the one above described may be provided for reversing the axle 12, the eccentric 29ª being employed therein instead of the eccentric 29; as above described.

All the other parts of the reversing mechanism may be similar to those of the forward propelling machanism; only the arm 16 may be shorter, and the crank 13 may be replaced by an eccentric.

The eccentric 29 or 29ª may be replaced by a cam and follower or some other means for shortening the above described flexible member, thereby tightening the chain 32—34—33 or the clutch strap 55, and thereby detachably connecting the levers 27 and 57 to the friction wheels 36 and 56 respectively.

A graduated segment may be employed for the foot pedal or lever 41 for indicating the different positions of the block 22 and corresponding variations of speed of the axle 12.

As an inferior substitute for the rocking arm 16, as shown in Fig. 1, a slotted arm may be employed.

The clutch may also be varied in design; and in the reversing mechanism, above referred to, the clutch may also be employed as a brake, if desired.

Many other changes could be made in my mechanism for power transmission and speed variation in automobiles without departing from the main scope of my invention and parts of my invention may be used without other parts.

My above described mechanism for power transmission and speed variation may also be used in machines other than automobiles.

I do not, therefore, restrict myself to the details as shown in the drawings; but I intend to include also all mechanical equivalents and reasonably obvious modifications of the same within the scope of my invention.

What I claim as my invention and desire to secure by Letters Patent is:

1. In a means for power transmission and speed variation a friction wheel and a flexible member encircling the same, an oscillating member, pivotally connected to said flexible member at one end thereof, to swing in the plane of said wheel, and a corresponding member at the other end of said flexible member, said oscillating member having a curved periphery, the curvature of which is deviating from the center of the pivot of said oscillating member, and said corresponding member being so disposed as to be in engagement with the part of said periphery, which is transpivotal with relation to said corresponding member, when said oscillating member is turned in one direction and out of engagement therewith when said oscillating member is turned in the opposite direction, thereby alternately tightening said flexible member on to said wheel and loosening the same thereon, combined with a means for turning said oscillating member alternately in opposite directions, thereby turning said wheel.

2. In a mechanism for power transmission and speed variation a friction wheel, a flexible member encircling the periphery thereof, an eccentric and strap connected to the ends of the flexible member and an oscillating clutch-lever secured to the eccentric and adapted, at a suitable velocity, during every alternate stroke thereof by turning the eccentric to tighten the flexible member on to the wheel and to turn the wheel therewith and during every other stroke to loosen the flexible member, thereby releasing the wheel.

3. In a means for power transmission a rotary member and a flexible member encompassing the outer periphery thereof, combined with an eccentric joining to each other the ends of said flexible member and adapted, when turned in one direction, to draw towards each other the ends of said flexible member, thereby causing the same to engage said rotary member and turn the same in one direction, another eccentric connected to a similar flexible member and adapted, when turned in the opposite direction, to draw towards each other the ends of said similar flexible member, thereby causing the same to engage said rotary member and turn the same in the opposite direction, and a means for actuating each of said eccentrics.

4. In a means for power transmission and speed variation a friction wheel, a flexible member encircling the periphery thereof, said flexible member having at one end thereof an eccentric, which is pivotally connected thereto and engaged by a corresponding strap at the other end of said flexible member, said strap extending beyond said pivotal connection to react on the transpivotal part of said eccentric, which is to act on said strap when turned in one direction, thereby shortening said flexible member and thereby tightening the same on to said wheel, combined with a means for oscillating said eccentric alternately in opposite directions, thereby turning said wheel.

5. In a means for power transmission and speed variation a friction wheel, a flexible member encircling the periphery thereof and an oscillating member connected to the ends of the flexible member and adapted, at a suitable velocity, during every alternate stroke thereof to tighten the flexible member on to the wheel and to turn the wheel therewith and during every other stroke to loosen the flexible member, thereby releasing the wheel, combined with a means for operating the oscillating member and a means for drawing the oscillating member into a position to loosen the flexible member when the operation of the oscillating member is discontinued.

ISRAEL BENJAMINS.